United States Patent [19]

Nakamura

[11] Patent Number: 5,051,939

[45] Date of Patent: Sep. 24, 1991

[54] VECTOR DATA RETRIEVAL APPARATUS

[75] Inventor: Toshihiko Nakamura, Koufu, Japan

[73] Assignee: NEC Corporation, Tokyo, Japan

[21] Appl. No.: 540,239

[22] Filed: Jun. 19, 1990

[30] Foreign Application Priority Data

Jun. 19, 1989 [JP] Japan .................................. 1-154708

[51] Int. Cl.[5] .............................................. G06F 7/38
[52] U.S. Cl. .............................................. 364/715.06
[58] Field of Search ............. 364/715.06, 736, 715.01;
340/146.2

[56] References Cited

U.S. PATENT DOCUMENTS

| | | | |
|---|---|---|---|
| 4,567,572 | 1/1986 | Morris et al. | 364/715.06 |
| 4,761,754 | 8/1988 | Kinoshita | 364/736 |
| 4,799,152 | 1/1989 | Chuang et al. | 364/715.06 |
| 4,918,636 | 4/1990 | Iwata et al. | 364/715.06 |

Primary Examiner—Dale M. Shaw
Assistant Examiner—Long T. Nguyen
Attorney, Agent, or Firm—Sughrue, Mion, Zinn Macpeak & Seas

[57] ABSTRACT

A vector data retrieval apparatus includes a unit for instructing whether to output a smallest or largest element number of element numbers to be output when a plurality of maximum or minimum values are present in vector data.

1 Claim, 3 Drawing Sheets

VECTOR DATA RETRIEVAL APPARATUS

BACKGROUND OF THE INVENTION

The present invention relates to retrieval of maximum and minimum values of vector data and, more particularly, to a vector data retrieval apparatus capable of retrieving element numbers corresponding to maximum or minimum values as retrieval results together with data.

FIG. 3 shows a conventional vector data retrieval apparatus. Referring to FIG. 3, reference numeral 1 denotes a vector data holding means for holding an ordered set of vector data; 2, a register in which vector data read out from the vector data holding means 1 is set; 3, an element number generating means for generating an element number corresponding to the vector data; 4, a register in which the element number generated by the element number generating means 3 is set; 5, a comparing means for comparing the data stored in the register 2 with data stored in a register 8 (to be described below) and outputting a selection signal $T_0$; 6, a selecting means for selecting one of vector data $F_1$ and $F_2$ respectively stored in the registers 2 and 8 in response to the selection signal $T_0$; 7, a selecting means for selecting one of element numbers $G_1$ and $G_2$ respectively stored in the register 4 and a register 9 (to be described below) in response to the selection signal $T_0$; 8, the register for storing vector data selected by the selecting means 6; and 9, the register for storing an element number selected by the selecting means 7.

Note that, since element numbers are provided in one-to-one correspondence with vector data, they never coincide with each other but vary in value.

An operation of the vector data retrieval apparatus having the above-described arrangement will be described below. In the first cycle time, the first data of an ordered set of vector data is output from the vector holding means 1 and is set in the register 2. An element number corresponding to the vector data is generated by the element number generating means 3 and is set in the register 4. The data comparing means 5 compares the vector data stored in the register 2 with vector data stored in the register 8. In this case, however, since no vector data is stored in the register 8, the data comparing means 5 does not perform data comparison but generates a selection signal $T_0$ for causing the selection means 6 and 7 to select the data stored in the registers 2 and 4, respectively. In the second cycle time, the second data held in the vector data holding means 1 is output and set in the register 2. An element number corresponding to this vector data is generated by the element number generating means and is set in the register 4. At the same time, the previous data in the registers 2 and 4, i.e., the first data of the ordered set of vector data and the corresponding element numbers, are respectively stored in the registers 8 and 9 in accordance with the selection signal $T_0$, which is generated by the data comparing means 5 in the first cycle to cause the selecting means 6 and 7 to select the data. The data comparing means 5 compares values $F_1$ and $F_2$ of the vector data respectively stored in the registers 2 and 8, i.e., the second and first data of the vector data, with each other. The data comparing means 5 then generates and outputs a selection signal $T_0$ for causing the selecting means 6 to select a larger value in response to an instruction of "maximum value retrieval" and to select a smaller value in response to an instruction of "minimum value retrieval". If the value of the vector data stored in the register 2 is equal to that of the vector data stored in the register 8, the data comparing means 5 always generates and outputs a selection signal $T_0$ for causing the selecting means 6 to select the value set in the register 8. More specifically, the comparing means 5 receives the data $F_1$ and $F_2$ as comparison targets and generates the signal $T_0$ for causing the selecting means 6 to select the data $F_1$ if the instruction of "maximum value retrieval" is provided and $F_1 > F_2$. If the instruction of "maximum value retrieval" is provided and $F_1 \leq F_2$, the comparing means 5 generates the signal $T_0$ for causing the selection means 6 to select the data $F_2$. The comparing means 5 generates the signal $T_0$ for causing the selecting means 6 to select the data $F_1$ if the instruction of "minimum value retrieval" is provided and $F_1 < F_2$. If the instruction of "minimum value retrieval" is provided and $F_1 \geq F_2$, the comparing means 5 generates the signal $T_0$ for causing the selection means 6 to select the data $F_2$. The selection means 7 selects and outputs either an output $G_2$ from the register 9, in which the element number corresponding to the first data of the vector data is stored, or an output $G_1$ from the register 4, in which the element number corresponding to the second data of the vector data is stored, in accordance with the same selection signal $T_0$ as supplied to the selecting means 6. Similarly, the maximum or minimum values of n vector data (n is a natural number) can be stored in the register 8 in the (n+1)th cycle time, and an element number corresponding to the maximum or minimum value stored in the register 8 can be stored in the register 9.

In the above-described conventional vector data retrieval apparatus, when data as comparison targets input to the data comparing means coincide with each other, an output from the same register (the register 8) is always selected. Therefore, if element numbers are input in an order of increasing values, a smaller number is selected as an element number assigned to a retrieval result. If element numbers are input in order of decreasing values, a larger number is selected as an element number assigned to a retrieval result. If element numbers are arbitrarily input, an arbitrary one of the element numbers is selected as an element number assigned to a retrieval result. Assume that a plurality of maximum or minimum values are present in vector data as retrieval targets. In this case, if the smallest element number is required as an element number assigned to a retrieval result, the vector data must be rearranged to be input to the vector data retrieval apparatus in an order of increasing element numbers. If the largest element number is required, the vector data must be rearranged to be input to the vector data retrieval apparatus in an order of decreasing element numbers. This undesirably increases the processing time as a whole.

SUMMARY OF THE INVENTION

It is an object of the present invention to provide a vector data retrieval apparatus which can greatly reduce the processing time required for retrieval and provides a good environment to allow an easy operation.

In order to achieve the above object, according to the present invention, there is provided a vector data retrieval apparatus for receiving an ordered set of vector data and retrieving/outputting a maximum or minimum value of the vector data and an element number corresponding to the maximum or minimum value, comprising means for instructing whether to output a smallest or largest element number of element numbers to be output when a plurality of maximum or minimum values are present in the vector data.

According to the present invention, if a plurality of maximum or minimum values are present in vector data to be retrieved, an instruction can be provided to designate whether to output the largest or smallest element number of element numbers to be output, as needed.

DETAILED DESCRIPTION OF THE PREFERRED EMBODIMENTS

Figure 1:
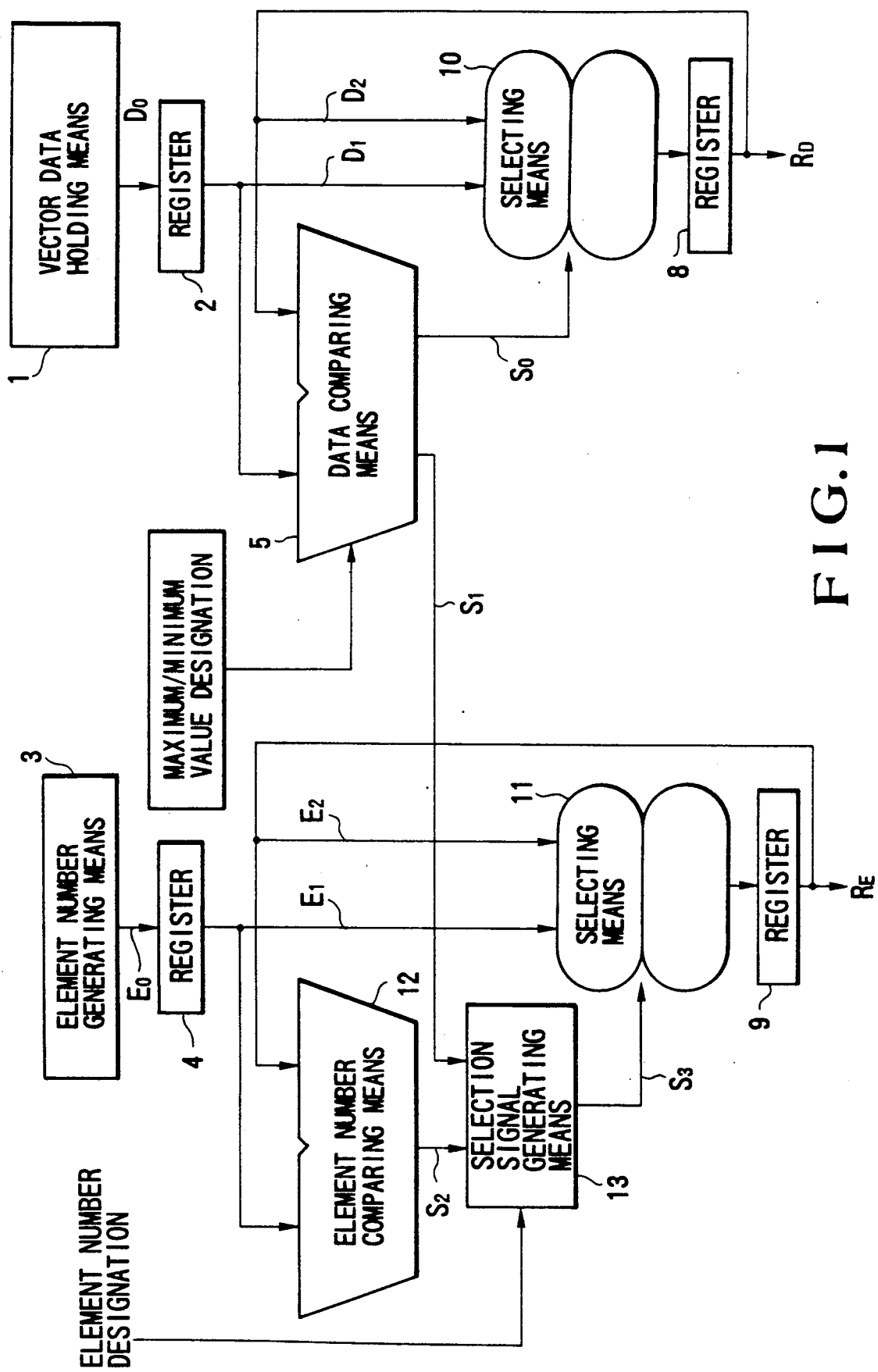
FIG. 1 is a block diagram showing a vector data retrieval apparatus according to an embodiment of the present invention.

FIG. 1 shows a vector data retrieval apparatus according to an embodiment of the present invention. Referring to FIG. 1, reference numeral 10 denotes a selecting means for selecting either an output $D_1$ from a register 2 or an output $D_2$ from a register 8 in accordance with a selection signal $S_0$, and outputting it to the register 8; 11, a selecting means for selecting either an output $E_1$ from a register 4 or an output $E_2$ from a register 9, and outputting it to the register 9; 12, an element number comparing means for comparing the output $E_1$ from the register 4 with the output $E_2$ from the register 9, i.e., the value of an element number corresponding to the second vector data of the vector data with the value of an element number corresponding to the first vector data so as to obtain a relationship in magnitude, and generating and outputting a comparison data signal $S_2$ representing it; and 13, a selection signal generating means. The selection signal generating means 13 compares an output $S_1$ from the data comparing means 5 with an output $S_2$ from the element number comparing means 12, and performs the following control:

(A): In a case wherein the values of data as comparison targets are not equal in value, the selection signal generating means 13 generates and outputs the output $E_1$ from the register 4 when the selecting means 10 selects an element number corresponding to data to be selected, i.e., the output $D_1$ from the register 2. When the selecting means 10 selects the output $D_2$ from the register 8, the selection signal generating means 13 generates and outputs a selection signal $S_3$ for selecting the output $E_2$ from the register 9.

(B): In a case wherein data as comparison targets are equal in value, (B-1): if an instruction of "largest element number designation" is provided, the selection signal generating means 13 generates and outputs a selection signal $S_3$ for causing the selecting means 11 to select a larger element number in accordance with the comparison data signal $S_2$ supplied from the element number comparing means 12, and (B-2) if an instruction of "smallest element number designation" is provided, the selection signal generating means 13 generates and outputs a selection signal $S_3$ for causing the selecting means 11 to select a smaller element number.

An operation of the vector data retrieval apparatus having the above-described arrangement will be described below. In the first cycle time, the first data of an ordered set of vector data is output from the vector holding means 1 and is set in the register 2. An element number corresponding to this vector data is generated by the element number generating means 3 and is set in the register 4. The data comparing means 5 compares the vector data stored in the register 2 with vector data stored in the register 8. In this case, since no vector data is stored in the register 8, no data comparison is performed, and the selecting means 10 generates and outputs a selection signal $S_0$ for selecting the output $D_1$ from the register 2. Values stored in the registers 4 and 9 are element numbers to be compared by the element number comparing means 12. However, since no element number as a comparison target is stored in the register 9, the element number comparing means 12 does not perform comparison but commands the selection signal generating means 13 to generate a selection signal $S_3$ for causing the selecting means 11 to select the output $E_1$ from the register 4. In the second time cycle, the second data held in the vector data holding means 1 is read out and set in the register 2. At the same time, an element number corresponding to the second data is set in the register 4. In addition, the output $D_1$ (the first vector data) is set in the register 8, and the output $E_1$ (the first element number corresponding to the first vector data) from the register 4 is set in the register 9. The data comparing means 5 compares the output $D_1$ from the register 2 with the output $D_2$ from the register 8, i.e., the second data of the vector data with the first data. The comparing means 5 then generates a selection signal $S_0$ for causing the selecting means 10 to select a larger value in response to an instruction of "maximum value retrieval", and to select a smaller value in response to an instruction of "minimum value retrieval". If the data stored in the registers 2 and 8 are equal in value, the comparing means 5 always generates and outputs a selection signal $S_0$ for causing the selecting means 10 to select the output $D_1$ from the register 2. Therefore, the selecting means 10 selects one of the outputs $D_1$ and $D_2$ from the registers 2 and 8 in accordance with this selection signal $S_0$, and outputs it to the register 8. In addition, the data comparing means 5 outputs, to the selection signal generating means 13, a signal $S_1$ representing whether the outputs $D_1$ and $D_2$ from the registers 2 and 8 are equal in value, together with the signal for designating the selecting means 10 to select one of the outputs $D_1$ and $D_2$ from the registers 2 and 8. The element number comparing means 12 compares the output $E_1$ from the register 4 with the output $E_2$ from the register 9, i.e., the value of the element number corresponding to the second data of the vector data with the value of the element number corresponding to the first data so as to obtain a relationship in magnitude, and generates and outputs a comparison data signal $S_2$ representing it. The selection signal generating means 13 receives the output $S_1$ from the data comparing means 5 and the output $S_2$ from the element number comparing means 12. In a case wherein the values of the data to be compared are not equal in value, if the selecting means 10 selects the element number corresponding to the data to be selected by the selecting means 10, i.e., the output $D_1$ from the register 2, the selection signal generating means 13 generates and outputs a selection signal $S_3$ for selecting the output $E_1$ from the register 4. If the selecting means 10 selects the output $D_2$ from the register 8, the selection signal generating means 13 generates and outputs a selection signal $S_3$ for selecting the output $E_2$ from the register 9. In a case wherein the values of the data to be compared are equal in value, the selection signal generating means 13 generates and outputs a selection signal $S_3$ for causing the selecting means 11 to select a larger element number in response to an instruction of "largest element number designation" and to select a smaller element number in response to an instruction of "smallest element number designation" in accordance with the comparison data signal $S_2$ supplied from the element number comparing means 12. With this operation, the selecting means 11 selects one of the outputs $E_1$ and $E_2$ from the registers 4 and 9 in accordance with a selection signal $S_3$, and outputs it to the register 9. Similarly, the maximum or minimum value of n vector data (n is a natural number) is stored in the register 8 in the (n+1)th cycle time. If a plurality of maximum or minimum values are present in the vector data, the largest or smallest element number of the corresponding element numbers can be stored in the register 9 in accordance with an element number designation instruction.

Figure 2:
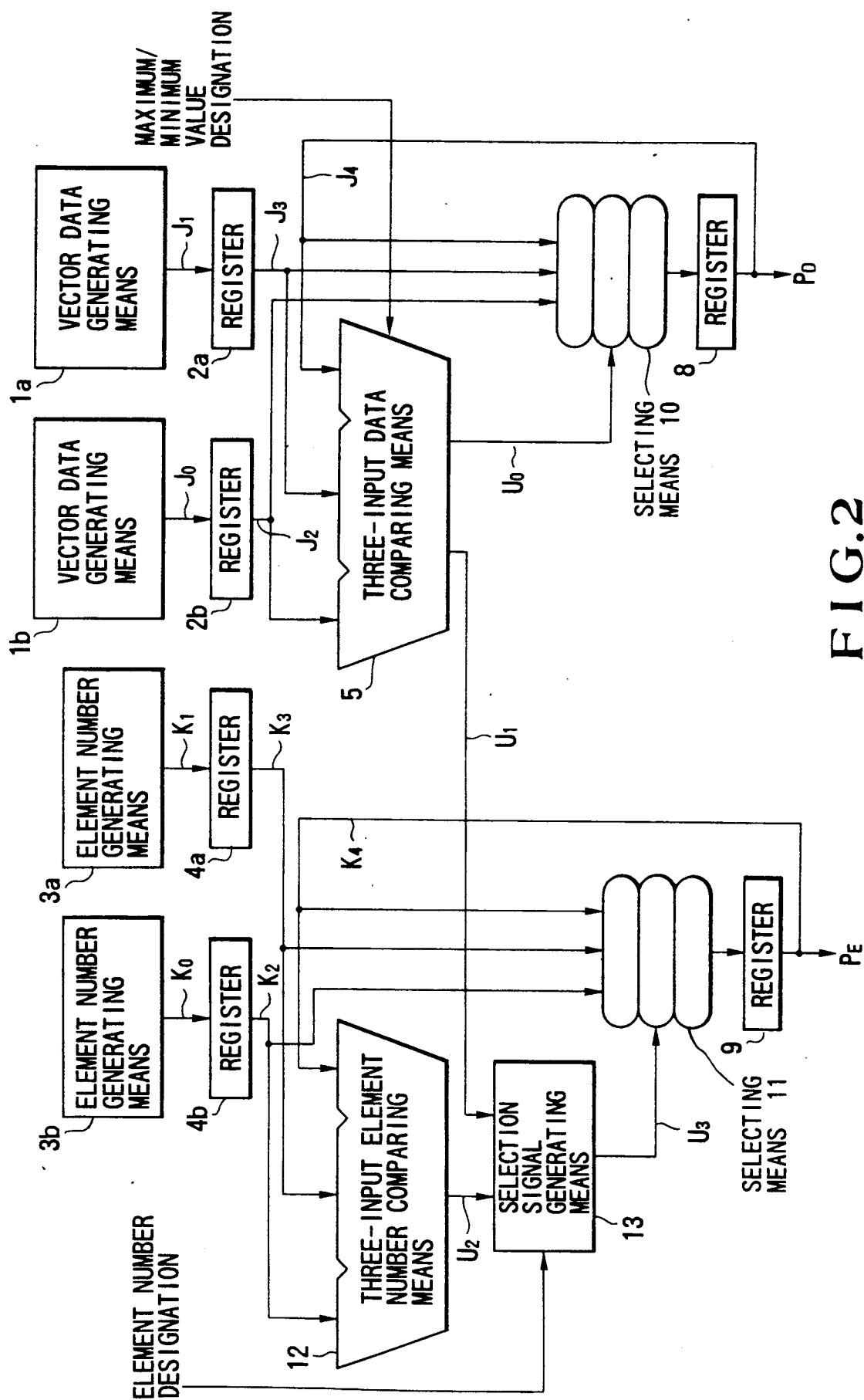
FIG. 2 is a block diagram showing a vector data retrieval apparatus according to another embodiment of the present invention.
Figure 3:
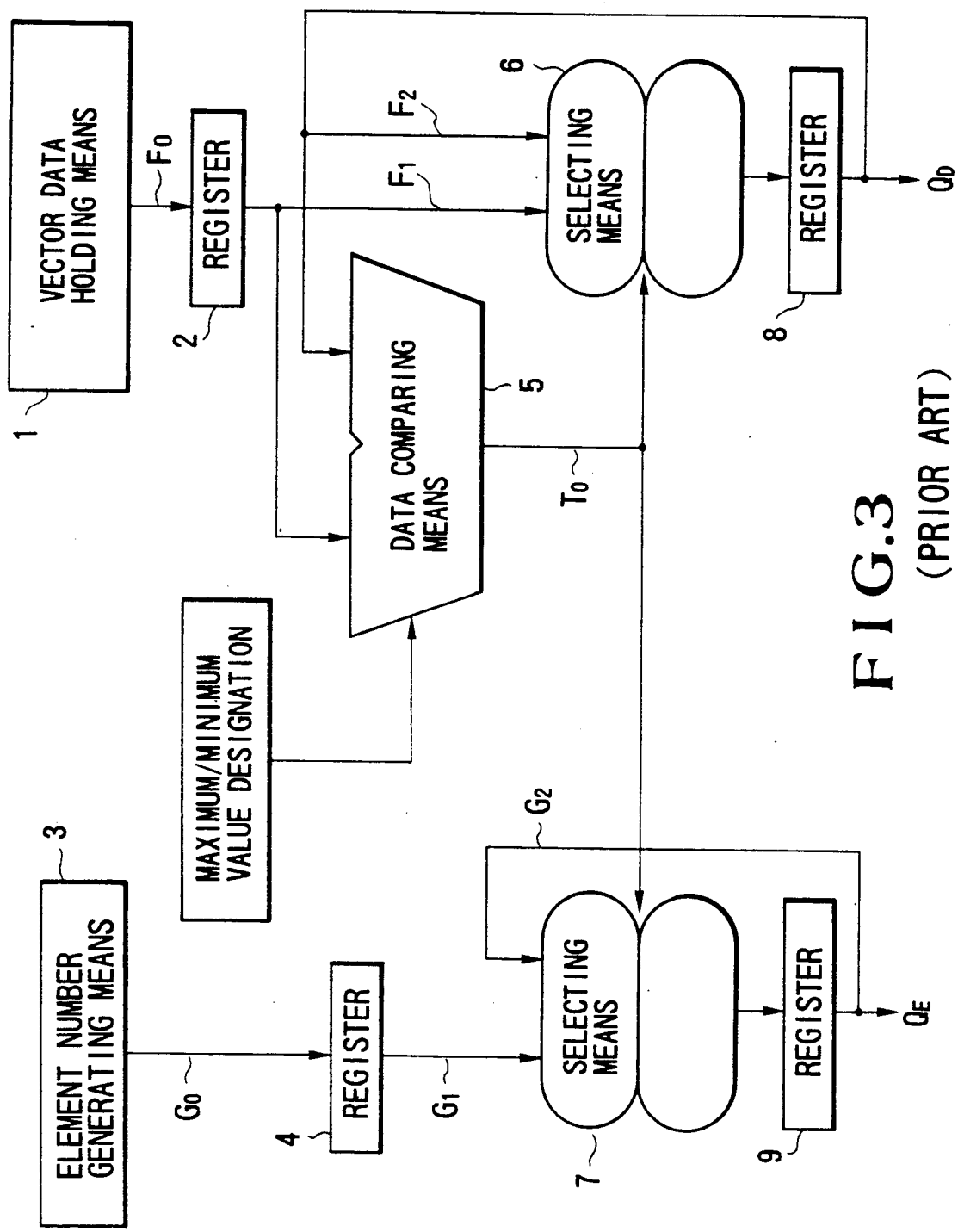
FIG. 3 is a block diagram showing a conventional vector data retrieval apparatus.

FIG. 2 shows a vector data retrieval apparatus according to another embodiment of the present invention, which uses a three-input data comparing means as a data comparing means. In this embodiment, a vector data holding means is constituted by two vector data holding means 1a and 1b, to which an ordered set of vector data is distributed. In addition, an element number generating means is constituted by element number generating means 3a and 3b so as to output element numbers corresponding to vector data held in the respective vector data holding means 1a and 1b. No identical element numbers exist. With this arrangement, registers 2 and 4 are respectively constituted by registers 2a and 2b, and 4a and 4b. Similarly, a data comparing means 5 and an element number comparing means 12 are respectively constituted by three-input comparing means. Selecting means 10 and 11 select data and element numbers in accordance with selection signals $U_0$ and $U_3$, respectively.

An operation of the vector data retrieval apparatus having the above-described arrangement will be described below. In the first cycle time, first data are respectively read out from the vector data holding means 1a and 1b and are set in the registers 2a and 2b. At the same time, element numbers respectively corresponding to the data are generated by the element number generating means 3a and 3b and are set in the registers 4a and 4b. The three-input comparing means 5 compares an output $J_2$ from the register 2b, an output $J_3$ from the register 2a, and an output $J_4$ from a register 8 with each other. In this case, however, since no data is stored in the register 8, the output $J_4$ is not considered as a comparison target, and the outputs $J_2$ and $J_3$ are compared with each other. The comparing means 5 then generates and outputs a selection signal $U_0$ for causing the selecting means 10 to select a proper value in accordance with an instruction of maximum or minimum value detection. An output $K_2$ from the register 4b, an output $K_3$ from the register 4a, and an output $K_4$ from a register 9 are the values of element numbers to be compared with each other by the three-input element number comparing means 12. In this case, however, since no element number as a comparison target is stored in the register 9, the output $K_4$ is not considered as a comparison target. The comparing means 12 obtains a relationship in magnitude between the outputs $K_2$ and $K_3$ and outputs it as a comparison data signal $U_2$. A data comparison data signal $U_1$ generated and output from the three-input data comparing means 5 consists of a signal for designating the selecting means 10 to select a specific value, and a signal representing another data having the same value as the selected value. If comparison data to be input to the three-input data comparing means 5 do not include data having the same value as that of data to be selected, a selection signal generating means 13 generates and outputs a selection signal $U_3$ for causing the selecting means 11 to select an element number corresponding to the data to be selected. If comparison data include data having the same value as that of data to be selected, the selection signal generating means 13 generates and outputs a selection signal $U_3$ for causing the selecting means 11 to select a proper element number based on the comparison data signal $U_2$ in response to an instruction of element number designation. The selection means 10 and 11 respectively select and output data and element numbers in accordance with the selection signals $U_0$ and $U_3$. In the second cycle, the second data are respectively read out from the vector data holding means 1a and 1b and are set in the registers 2a and 2b. At the same time, element numbers corresponding to the data are respectively generated and output from the element number generating means 3a and 3b and are set in the registers 4a and 4b. In addition, the selection results from the selecting means 10 and 11 are respectively stored in the registers 8 and 9. In this case, comparison targets of the three-input data comparing means 5 are the outputs $J_2$, $J_3$, and $J_4$ from the registers 2b, 2a, and 8. Therefore, processing based on the comparison between these three data is performed. By repeating similar operations, the maximum or minimum value of 2n vector data is stored in the register 8 in the (n+1)th cycle time. If a plurality of maximum or minimum values are present in the vector data, the largest or smallest element number of the corresponding element numbers can be stored in the register 9 in accordance with an instruction of element number designation.

As has been described in detail above, according to the vector data retrieval apparatus of the present invention, element numbers are also compared with each other. Therefore, even if a plurality of maximum or minimum values are present in vector data as retrieval targets, the largest or smallest element number of the corresponding element numbers can be obtained on the basis of the comparison data, as needed, in accordance with an instruction of largest or smallest element number designation. This greatly reduces the processing time required for retrieval. In addition, since element numbers corresponding to data need not be input in an order of increasing or decreasing values, the data and the element numbers need not be rearranged prior to retrieval. This provides various advantages, e.g., reducing the processing time and providing a good environment to allow a user to easily operate the retrieval apparatus.

What is claimed is:
1. A vector data retrieval apparatus comprising:
a first register in which vector data to be retrieved are sequentially set;
a second register in which element numbers corresponding to the vector data set in said first register are sequentially set;
a third register in which selected vector data is set;

a fourth register in which a selected element number is set;

first selecting means for receiving the data set in said first and third registers, outputting one of the selected data in accordance with a selection signal, and setting the output data in said third register;

data comparing means for comparing the data set in said first and third registers with each other, outputting a selection signal for causing said first selecting means to select data having a larger value when maximum value retrieval is designated, and outputting a selection signal for causing said first selecting means to select data having a smaller value when minimum value retrieval is designated, while outputting a comparison data signal representing a comparison state of the respective data;

second selecting means for receiving the element numbers set in said second and fourth registers, outputting one of the selected element numbers in accordance with a selection signal, and setting the output element number in said fourth register;

element number comparing means for comparing the element numbers set in said second and fourth registers with each other, and outputting a comparison data signal representing a relationship in magnitude between values of the element numbers; and selection signal generating means for receiving the comparison data signal from said data comparing means and said element number comparing means, outputting a selection signal for causing said second selecting means to select an element number corresponding to data selected by said first selecting means when the respective data compared by said data comparing means are not equal in value, and, when the respective data compared by said data comparing means are equal in value, outputting a selection signal for causing said second selecting means to select an element number having a larger value if largest element number designation is performed, and outputting a selection signal for causing said second selecting means to select an element number having a smaller value if smallest element number designation is performed.

* * * * *